United States Patent [19]

Molins

[11] 4,338,057

[45] Jul. 6, 1982

[54] HANDLING ROD-LIKE ARTICLES

[75] Inventor: Desmond W. Molins, London, England

[73] Assignee: Molins Limited, London, England

[21] Appl. No.: 90,434

[22] Filed: Nov. 1, 1979

[30] Foreign Application Priority Data

Nov. 1, 1978 [GB] United Kingdom ............... 42709/78
Apr. 4, 1979 [GB] United Kingdom ............... 7911868

[51] Int. Cl.³ .................... B65G 11/33; B65G 47/52
[52] U.S. Cl. .................................. 414/417; 198/347; 414/403
[58] Field of Search ............... 414/390, 391, 398, 403, 414/404, 417; 198/347, 358

[56] References Cited

U.S. PATENT DOCUMENTS

| 4,099,637 | 7/1978 | Molins | 414/417 X |
| 4,200,181 | 4/1980 | Clarke | 198/347 X |
| 4,201,507 | 5/1980 | Hinchcliffe et al. | 198/347 X |
| 4,222,478 | 9/1980 | Gasser | 198/358 |

Primary Examiner—Robert G. Sheridan
Attorney, Agent, or Firm—Craig and Antonelli

[57] ABSTRACT

A mobile reservoir system for rod-like articles such as cigarettes in which trays are moved in trolleys and each tray is capable of receiving articles in stack formation from an overhead mass flow outlet at a combined loading/unloading station. The mass flow outlet is closable by a rolling gate closure device. Each tray has parallel compartments for simultaneously receiving batches from streams passing from a producing machine and contains captive platforms movable by drive means at the loading/unloading station to progressively lower the articles into each compartment. Articles may be returned through the mass flow outlet by reversal of the drive means and upward movement of the platform; side bands may engage the articles through slots in the trays to aid this upward movement.

15 Claims, 16 Drawing Figures

HANDLING ROD-LIKE ARTICLES

This invention relates to apparatus for handling rod-like articles, and in particular to a conveyor system for moving articles such as cigarettes or cigarette filter rods in stack formation in a direction transverse to the lengths of the articles.

In the manufacture of filter cigarettes it is known to feed filter cigarettes in stack formation from a filter cigarette assembling machine to a filter cigarette packing machine. It is convenient to provide a buffer reservoir connected to a conveyor linking such an assembling machine to a packing machine so that differences between the supply from the assembling machine and the demand from the packing machine can be equalized by supply from or to the buffer reservoir. One system in which the reservoir comprises trolleys carrying trays which may be loaded with batches of cigarettes is disclosed in U.S. Pat. No. 3,967,740.

According to the present invention a conveyor system for rod-like articles includes means for conveying a stream of rod-like articles in a direction transverse to the lengths of the articles, means defining an opening along the path of said conveying means through which opening a stack of articles may pass to or from the conveying means, gate means for closing said opening means defining a path for a movable container having at least one compartment for a batch of rod-like articles in stack formation, said path being arranged so that compartments may be positioned successively at a station to receive articles from or deliver articles to said conveying means through said opening, and transfer conveyor means for conveying articles at said station between said opening and a compartment in a direction transverse to the lengths of the articles. The means for moving articles at said station may be arranged to move the articles within the compartment; the compartment may be arranged vertically below said opening and the articles in the compartment lowered or raised towards said opening. Alternatively, the articles may be lowered or raised in a channel at said station, the compartment being positioned adjacent the channel so that a plunger or the like may be used for moving a batch of articles between the channel and the compartment, in a direction parallel to the lengths of the articles. The conveyor system of the present invention may consist of apparatus solely for loading containers, or solely for unloading containers, as well as apparatus for loading and unloading containers.

The container may comprise a tray provided with a plurality of vertical compartments for receiving batches of articles. Alternatively the container could be part of an endless conveyor means. The gate means may comprise a rolling band closure as disclosed in U.S. application Ser. No. 973,704, to which reference is directed and the disclosure of which is hereby incorporated in full in the present specification. Each container may be removed from a trolley for conveyance on said path to said station and returned to said trolley for further conveyance.

A tray provided with vertical compartments may be arranged for use with a conveyor system in which articles are moved directly into the compartment, in which case the compartments may be open only at their upper ends, or for use with a system in which articles are transferred by means of a plunger, in which case the compartments must be open on one face. In the former case each compartment may be provided with a captive lifting platform or other member adapted to receive a descending stack in the compartment or lift a rising stack. Abutments may extend from the platform or member through slots in the sides of each compartment for engagement by hoisting (including lowering) means at the station.

In one arrangement the conveyor system includes parallel streams delivered from a filter cigarette assembling machine and parallel loading/unloading stations at which compartments may be loaded or unloaded simultaneously in pairs. This is convenient for linking the assembling machine to a packing machine without using a tip-turning device; the parallel streams are separated at the packing machine and fed to opposite sides of the packing machine hopper, thereby ensuring that the cigarettes are all facing the same way in this hopper. Equally, however, the present invention may be used with a single stream of articles, which may be delivered from a tip-turning device connected to a filter cigarette assembling machine.

The invention will be further described, by way of example only, with particular reference to the accompanying diagrammatic drawings in which.

Figure 1:
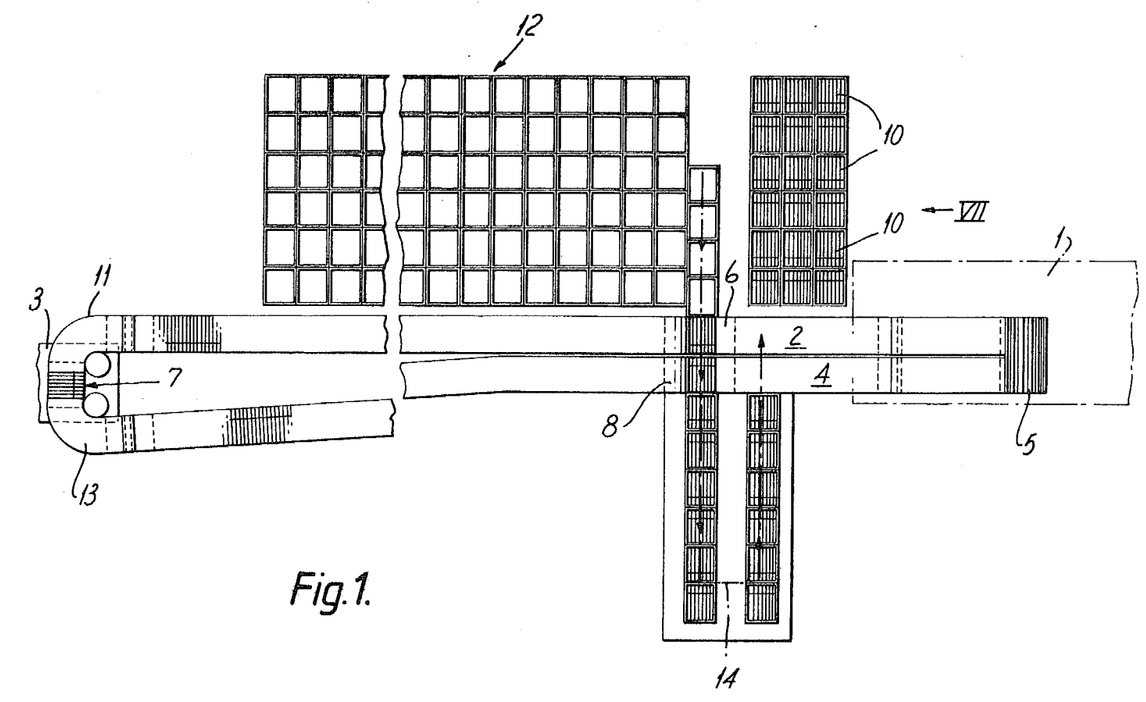
FIG. 1 is a plan view of a conveyor system for cigarettes.
Figure 2:
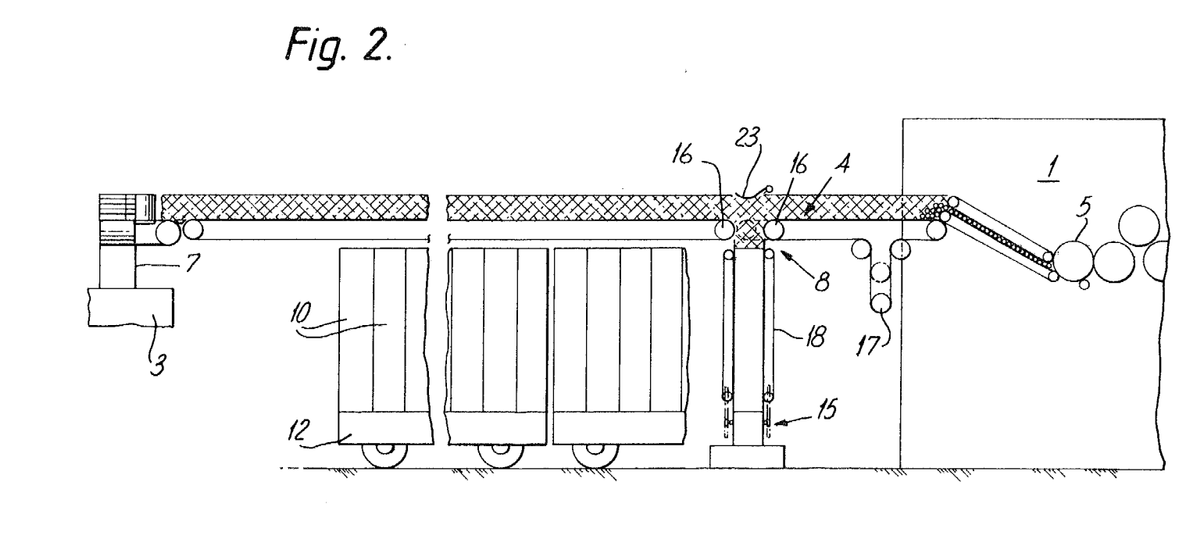
FIG. 2 is a side view of the system of FIG. 1.

FIGS. 1 and 2 show a conveyor system linking a Molins PA8 filter cigarette assembling machine 1 to a Molins HLP4 cigarette packing machine 3. The system includes separate conveyors 2, 4 for moving streams of cigarettes in stack formation on paths leading from a final cut drum 5 of the assembling machine 1 to opposite sides of a vaned hopper 7 of the packing machine 3. It may be noted that the radii of the curved sections 11, 13 respectively around which the stacks of cigarettes are moved from the conveyors 2, 4 to the hopper 7 are relatively small; this has the advantage of providing a compact system. The curved sections 11, 13 may be substantially as disclosed in U.S. application Ser. No. 958,720.

In order to provide a buffer reservoir facility combined loading/unloading stations 6, 8 are associated with each conveyor 2, 4 respectively. Trays 10, each comprising a pair of substantially vertical adjacent compartments, are carried in rows of three in trolleys 12 which are movable adjacent and parallel to the conveyor 2. Trays 10 may be moved out of a trolley 12 and subsequently returned thereto on a path 14 which passes the stations 6, 8 for simultaneous loading or unloading from the streams on conveyors 2 and 4. The direction of movement of the trays 10 on the path 14 (and of the trolley 12) depends on whether trays are being loaded or unloaded.

Cigarettes are passed from the conveyors 2, 4 into a tray 10 during loading (or vice versa during unloading) through openings defined between end pulleys 16. During normal operation of the conveyors 2, 4 to convey cigarettes to the packing machine 3 the pulleys 16 are adjacent each other so that the streams on conveyors 2 and 4 pass the stations 6, 8 without interruption. However, at least one of the pulleys 16 of each pair is laterally movable away from the other pulley to open a gap at the stations 6, 8 respectively in the conveyors 2, 4. The mechanism and arrangement whereby a pulley 16 is moved to open and close a gap in each of the conveyors 2, 4 may be substantially as disclosed in U.S. application Ser. No. 973,704, to which reference is directed for further details. As shown in FIG. 2 a movable pulley 17 may be provided to take up slack in the parts of the conveyors 2, 4 passing around movable pulley 16. Movement of the axis of pulley 17 could be used to control the position of the movable pulley 16 and thus whether the gap at the stations 6, 8 is open or closed.

Cigarettes are received in stack formation in a tray 10 through the respective openings associated with stations 6, 8 during loading (and returned through the openings during unloading) by means of lowering/lifting platforms movable in the trays 10 under action of a hoist mechanism 15. This may be aided by means of side bands 18 which engage the cigarette through slots in the sides of each compartment of a tray 10. The side bands 18 may be retracted away from the path of a tray 10 when not in use.

Figure 3:
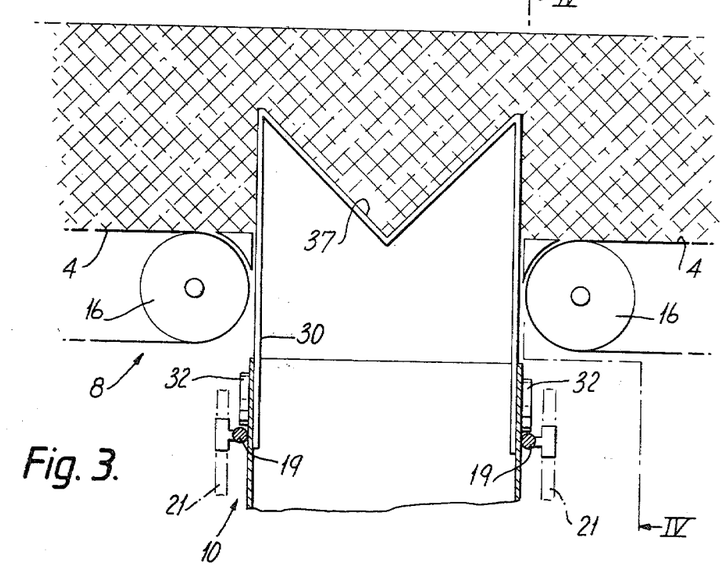
FIG. 3 is an enlarged side view of part of the system of FIG. 1.
Figure 4:
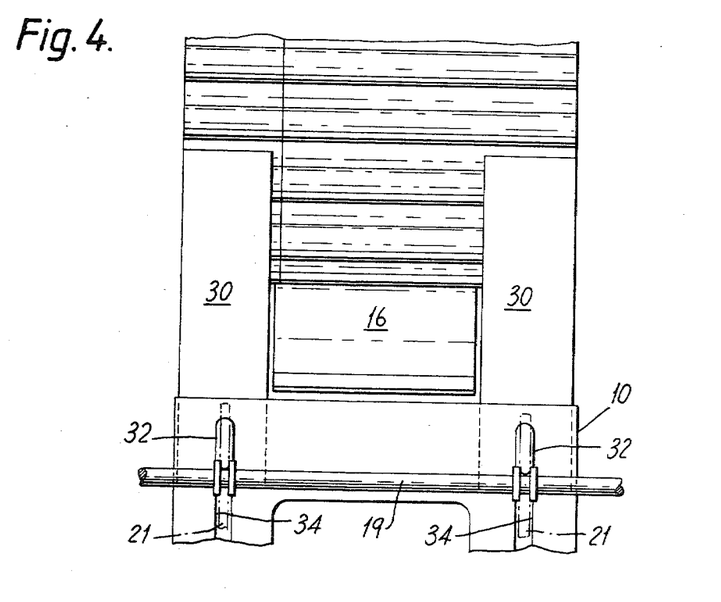
FIG. 4 is a view on the line IV—IV of FIG. 3.

FIG. 3 shows the top of a tray 10 at the station 8 at the end of an unloading cycle. The movable pulley 16 is restricted so that there is an opening between pulleys 16 to receive cigarettes from the unloading tray 10 on the conveyor 4. The cigarettes are moved upwards through the tray 10 and through the opening by upward movement of a lifting/lowering platform 30. As shown in FIG. 4 the platform 30 is in two parts (which may be interconnected) for engaging the cigarettes at their ends. Each part of the platform 30 has a V-shaped recess which contacts the cigarettes in the compartment of the tray 10. It is believed that a V-shaped platform reduces pressure on cigarettes at the bottom of a full compartment. The platform 30 has lugs 32 which project through vertical slots 34 in the sides of the tray 10, these lugs being engageable by the hoist mechanism 15 (which includes bars 19 carried by driven chains 21) whereby the platform 30 in each compartment of the tray 10 may be raised or lowered during loading or unloading. The speed of movement of the platforms 30 (controlled by the hoist mechanism 15) may be controlled by means of sensors 23 positioned over the conveyors 2, 4 at the stations 6, 8. The sensors 23 may also control the speed of the respective conveyors 2, 4 (or parts thereof) adjacent the junctions at stations 6, 8.

Figure 5:
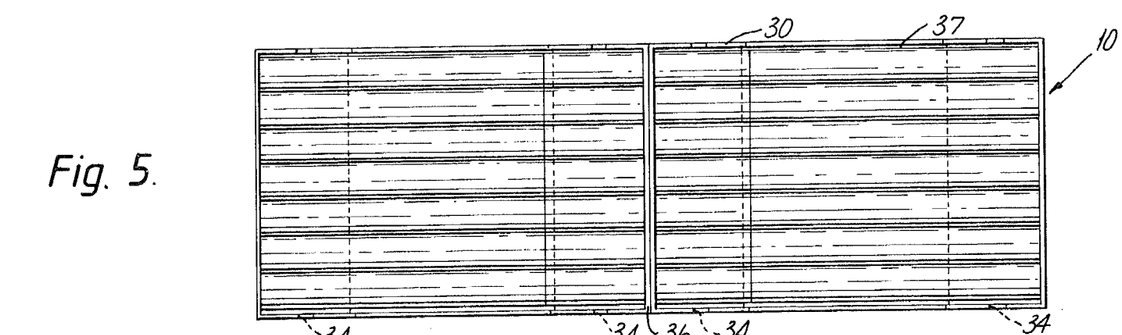
FIG. 5 is a plan view of a container for use in the system of FIG. 1.

FIG. 5 is a plan view of a full tray 10. As may be noted the cigarettes on each side of the central partition 36 face in opposite directions, having been simultaneously received from streams on conveyors 2 and 4 directly from the assembling machine 1.

Figure 6:
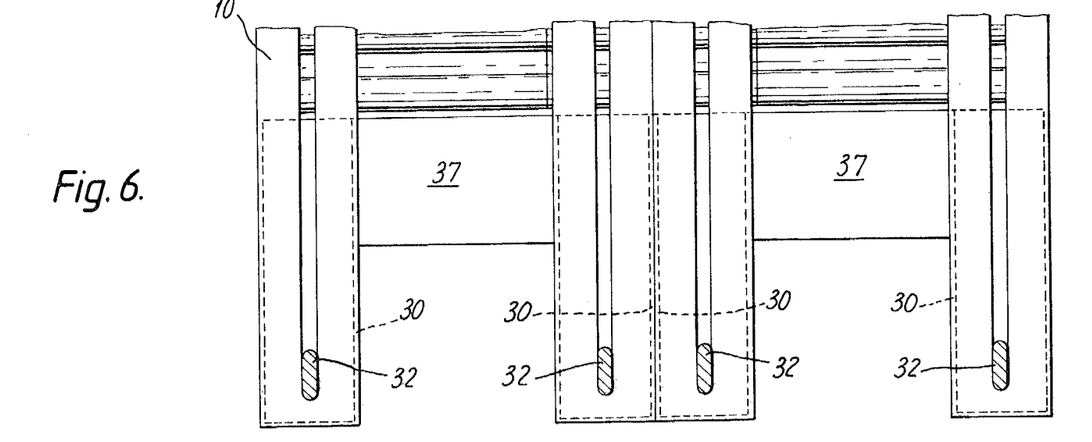
FIG. 6 is a side view of part of the container of FIG. 5.

FIG. 6 shows the bottom of a full tray 10 with the platforms 30 in their lowermost positions. Note that the middle sections of the cigarettes contained in the tray 10 are exposed above the platform 30 and bottom flanges 37 of the tray; the bands 18 may operate on these sections to aid lifting (or lowering).

Figure 7:
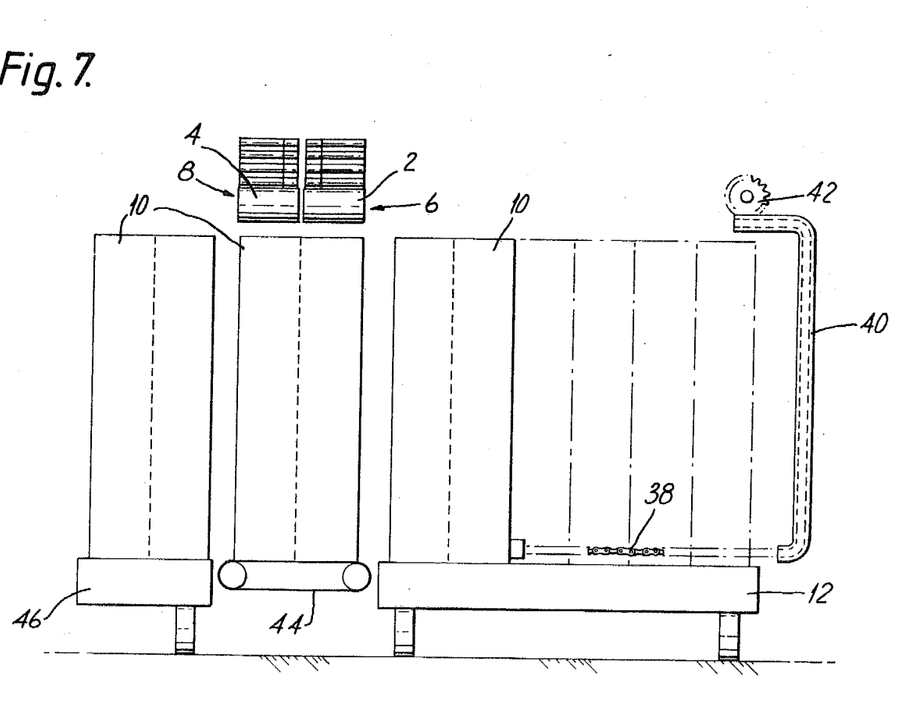
FIG. 7 is a view generally in the direction of arrow VII in FIG. 1.

The stations 6, 8 may be brought into operation whenever the supply of the assembling machine 1 does not match the demand of the packing machine 3. Trolleys 12 carrying empty trays 10 are movable to the right as viewed in FIGS. 1 and 2 to bring trays 10 into alignment with the stations 6, 8. The trolleys 12 may be provided with compartments and may be moved in a manner similar to that described in U.S. Pat. No. 3,967,740. Conveniently, three trays 10 are contained in each compartment of the trolley 12. Trays 10 are moved laterally into position underneath the conveyor 2, 4 at the stations 6, 8 as shown in FIG. 7. A semiflexible drive chain 38 movable in a casing 40 under action of a drive cog 42 may be used to feed trays 10 from each compartment of a trolley 12 into the loading/unloading. After leaving the trolley 12 trays may be received on a feed conveyor 44 on which they are held during loading or unloading and by which they are moved onto a transverse motion conveyor 46 for movement on that part of the path 14 which is parallel to the conveyors 2, 4. A single conveyor may then return the trays 10 in abutment into empty compartments of a trolley 12 at a position downstream of the position from which they were removed. As shown in FIG. 1 trays 10 are loaded by movement from the trolley on the left-hand path and returned on the right-hand path. Unloading takes place with the trays moving in the reverse direction on path 14.

Trays 10 which are full of cigarettes will, of course, have their platforms 30 at the lowermost positions. It is preferable that empty trays 10 should have their platforms 30 at their uppermost positions so that they are ready for filling. This may be arranged by providing the trolleys 12 with rails on the partitions, which rails engage with the hoist lugs 32 and hold the platforms 30 in their upper positions when an empty tray 10 is returned to the trolley compartment after unloading. These rails maintain the platforms 30 in their upper positions so that the lugs are in alignment with the hoist bars 19 when a tray is moved into position for loading.

Figure 8:
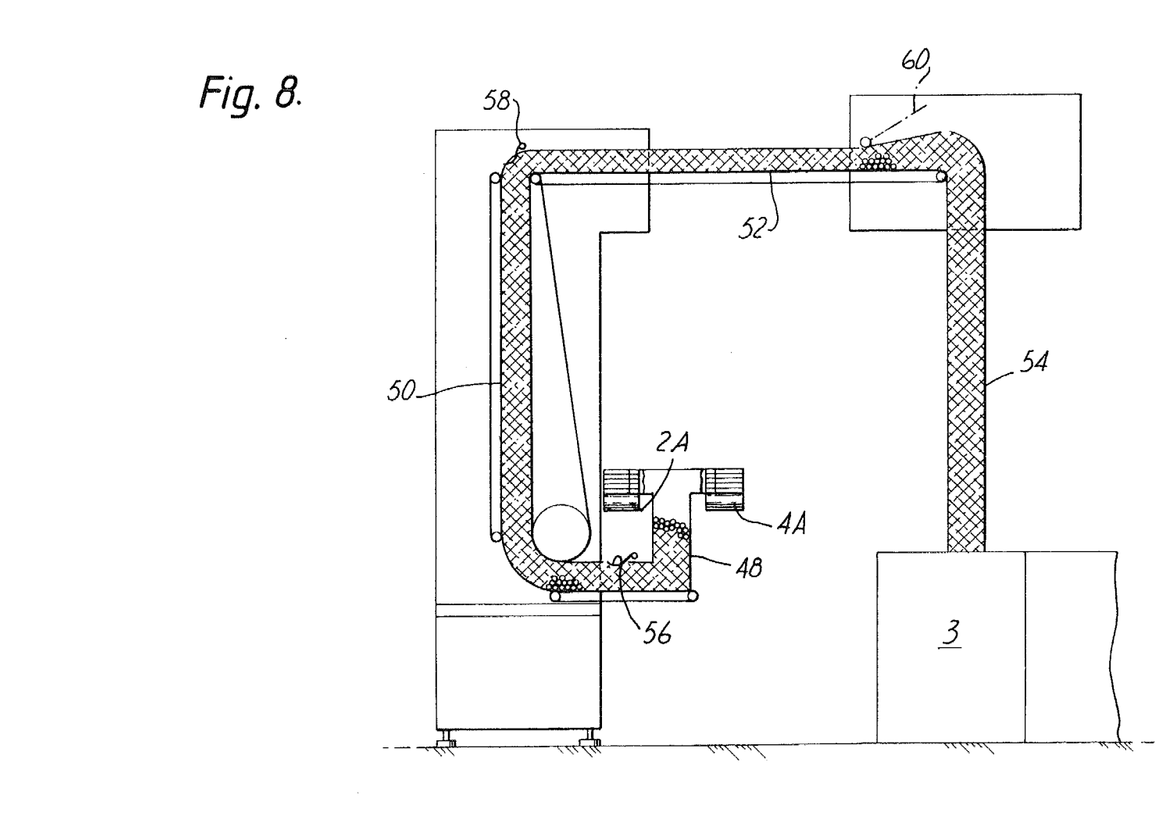
FIG. 8 is an end view of another conveyor system for cigarettes.

FIG. 8 is an end view of a conveyor system which is basically similar to that of FIG. 1 but in which conveyors 2A, 4A deliver the cigarettes to opposite sides of a short downdrop 48 which leads to a mass flow elevator 50 and to the packing machine 3 via an overhead conveyor section 52 and chute 54. Sensors 56 and 58 control flow into and through the elevator 50, and sensor 60, which also provides a small buffer reservoir, controls conveyor section 52. It might also be necessary to provide a sensor directly above the downdrop 48, which may control the conveyors 2A, 4A, and/or curved conveyor sections leading to the downdrop. The arrangement shown in FIG. 8 has the advantage that it allows full access around the packing machine 3 at floor level.

Figure 9:
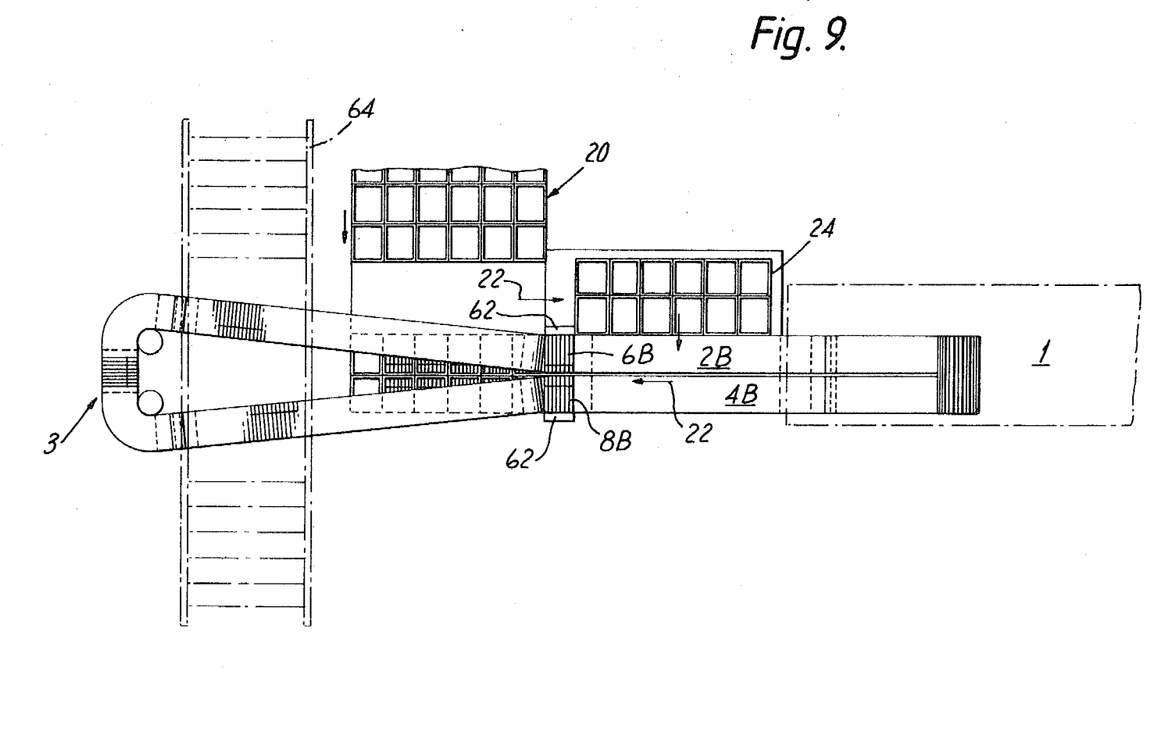
FIG. 9 is a plan view of a further conveyor system for cigarettes.
Figure 10:
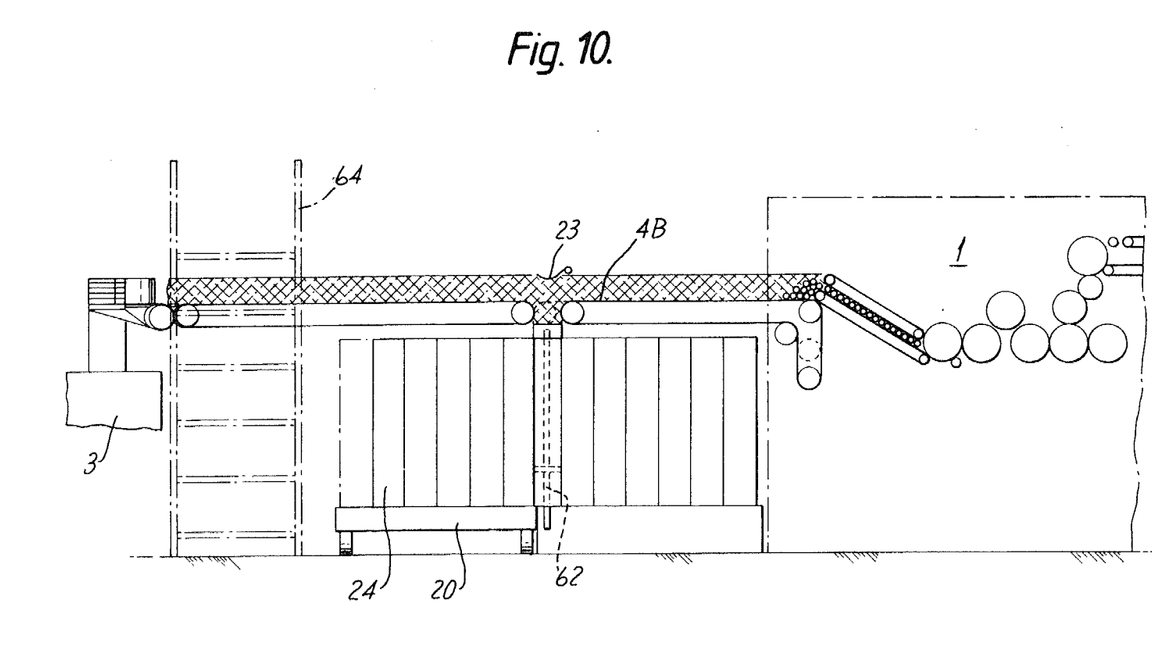
FIG. 10 is a side view of the conveyor system of FIG. 9.

FIGS. 9 and 10 show a further arrangement of a conveyor system, in which trolleys 20 are moved in direction transverse to conveyors 2B, 4B between the plug assembling machine 1 and the packing machine 3. The trolleys 20 are adapted to hold trays 24, each of which comprises six pairs of adjacent vertical compartments. The capacity of a tray 24 is therefore six times that of a tray 10. Trays 24 are moved from the trolley 20 on a path indicated at 22, which includes a section parallel to the conveyors 2B, 4B, to withdraw the tray from a trolley, followed by a transverse path section which moves the tray underneath the conveyors. Subsequently, the tray 24 is indexed in a direction parallel to the conveyors 2B, 4B so that successive pairs of compartments of the tray are positioned beneath the stations 6B, 8B, which are operated as before to load the compartments simultaneously with cigarettes from the stream on the conveyors. As successive pairs of compartments of a tray 24 are filled the tray is progressively moved back into a compartment of the trolley 20, which in the meantime has been indexed to move a further empty tray 25 into position for transfer onto the path 22. For unloading of the trays 24 the trolley 20 is moved in the opposite direction and trays 24 are moved in the reverse direction on path 22, so that the compartments of a tray 24 are unloaded during removal from the trolley 20. A mechanism suitable for moving trays to or from a trolley is described and illustrated in U.S. Pat. No. 2,919,531. Alternatively the bottoms of the trays 24 could be provided with teeth (e.g. of molded plastics material) which may be engaged by corresponding cogs or toothed belts to remove and return trays from or to a trolley 20. A cog may be movable into the path of trays 24 on the trolley 20 in order to initiate movement of the tray from the trolley (and return it fully into a trolley). The movement transverse to the conveyors 2B, 4B could be by means of pushers or a belt carrying projections which cause the trays 24 to slide axially on the cogs or belts which provide the longitudinal movement into and out of the trolley 20.

Each compartment of a tray 24 is provided with a captive platform which may be a flat plate guided to remain substantially horizontal in the compartment. The platform could comprise two parts, one of which is substantially U-shaped and the other of which is a flat plate normally lying at the bottom of the U. The hoist mechanism would then provide two movements, one to raise the composite platform to the upper part of the compartment, and the other to lift the plate relative to the outer U-shaped part and completely empty the compartment. Similarly, during loading the cigarettes would first be received on the plate and lowered into the U-shaped part before the latter starts moving downwards. Alternatively the platform could be similar to those used in the trays 10.

The lugs whereby the platform may be operated by a hoist mechanism at the loading/unloading stations 6B, 8B are arranged to extend outwards from the compartments in a direction parallel to the lengths of the cigarettes contained in the compartments, so that hoist bars, chains or the like at the loading/unloading stations may engage the lugs. Thus, the hoist mechanism 62 is arranged adjacent the path of the tray 24 underneath the loading/unloading stations on each side. The platforms in adjacent compartments may be connected through the central partition so that the hoist mechanism 62 always lifts or lowers both platforms at the stations 6B, 8B together.

In order to provide better access around the conveyor system and the machines 1 and 3 a bridge 64 is provided to cross the conveyors 2B, 4B between the machines.

Figure 11:
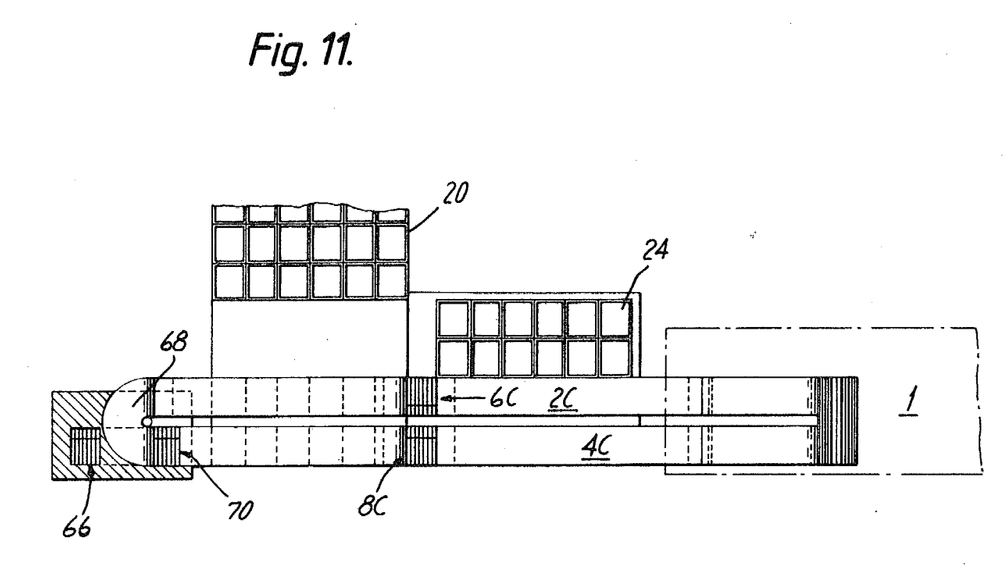
FIG. 11 is a plan view of a still further conveyor system for cigarettes.
Figure 12:
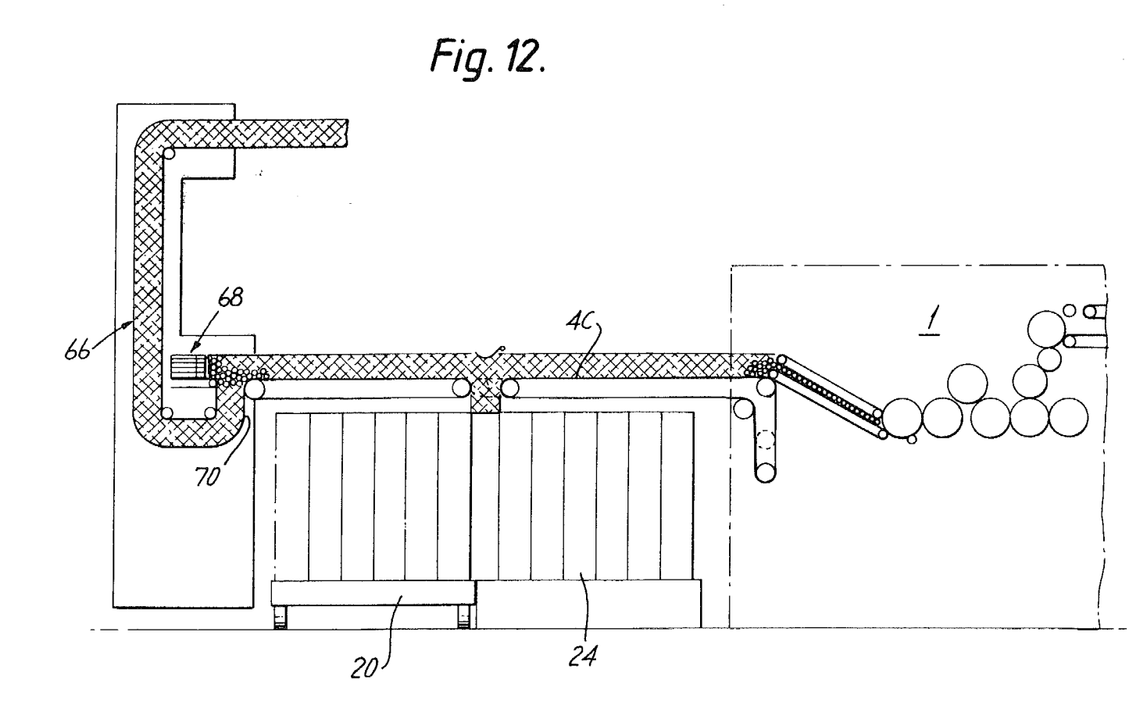
FIG. 12 is a side view of the conveyor system of FIG. 11.

FIGS. 11 and 12 show a system which is similar to that of FIGS. 9 and 10 but which includes an elevator 66 for feeding a combined stream to a remote packing machine. The system includes a 180° turn conveyor 68 for the stream from a conveyor 2C, which delivers the stream to a chute 70 leading to the elevator 66. The stream on conveyor 4 is delivered directly to the other side of the chute 70. The conveyor 68 may be as disclosed in U.S. application Ser. No. 958,720.

While the conveyor systems have been described with reference to conveyors and trays adapted for simultaneous loading or unloading from parallel streams delivered from an assembling machine, it will be appreciated that a loading and unloading station can be associated with a single conveyor for a stack of cigarettes delivered from an assembler provided with a tip-turner which combines the filter cigarettes after cutting. Any of the described and illustrated conveyor systems could be adapted for this purpose.

Where conveyor systems, such as those of FIGS. 1 to 12, convey separate streams direct from the assembling machine without tip-turning it may be necessary to provide a mechanism whereby the flow in each stream may be adjusted independently to compensate for variations in the supply to each stream. Such variations could occur, for example, if an inspection device associated with the assembling machine rejects more cigarettes in one stream than in the other. The compensating mechanism may comprise one or more sensors arranged to detect the level of cigarettes in each stream, conveniently including a sensor adjacent the packing machine hopper, and means responsive to the sensors to adjust the flow of the stream to maintain the levels at predetermined (equal) values. Said means may comprise independent drives for the conveyor for the streams; in some circumstances it might be necessary to temporarily stop or even reverse the drive in one of the conveyors to provide the required compensation. Another way in which the compensation might be achieved, in a system similar to that of FIG. 1 for example, would be to provide independently-controlled drives for the curved conveyor sections 11, 13 adjacent the hopper 7.

Figure 15:
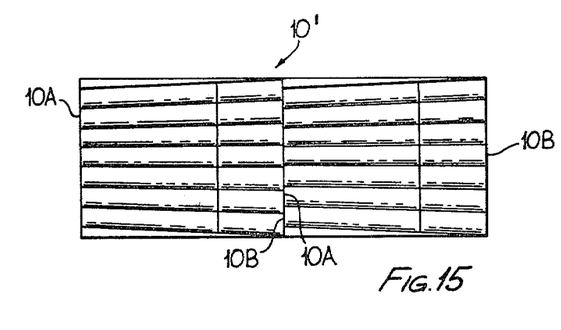
FIG. 15 is a plan view of a modified tray having opposed sides of differents widths.
Figure 16:
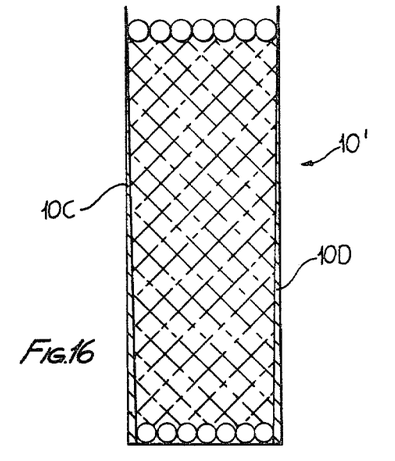
FIG. 16 is a sectional view of a modified tray having diverging sides.

The compartments of the trays 10 and 24 may be defined by wedge shaped partitions so that the compartments are wider across the side adjacent the filter tip ends of the cigarettes than across the opposite side. For example, FIG. 15 shows a modified tray 10' having opposed sides 10A and 10B of different widths. This allows the filter tip ends to spread out slightly and helps to compensate for "tip build up" which could otherwise result in a sloping upper surface of the cigarettes in the compartments. An important further possible modification in the shape of the compartments is to provide them with a slight taper, so that they are slightly wider (across the stream of cigarettes) at the end nearest the gate than at the end remote from the gate. That is, normally the compartments may be wider at the top than at the bottom. As seen in FIG. 16, a modified tray 10' may provide such a taper by means of diverging sides 10C and 10D. This slight taper has been found beneficial in aiding unloading of a compartment having a simple flat platform to move the cigarettes. The taper need only be slight; typically, with compartments 600 mm long and about 120 mm wide, the top of the compartment need only be about 2 mm wider than the bottom.

Figure 13:
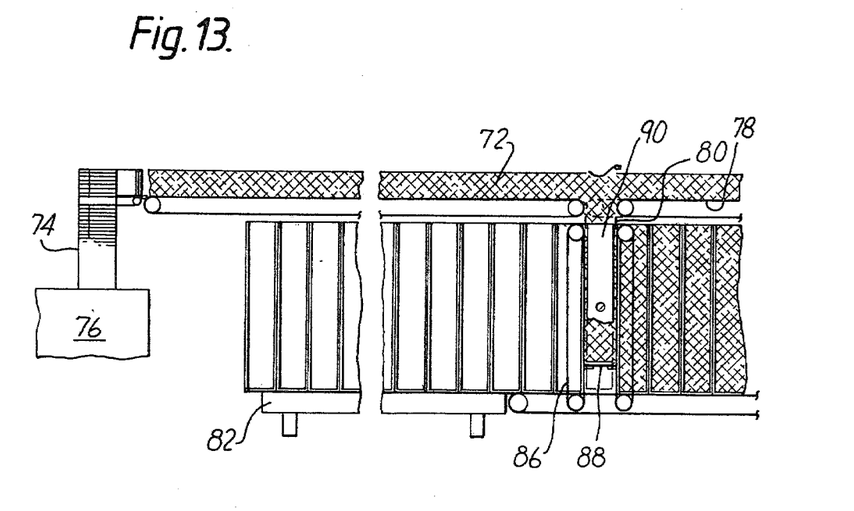
FIG. 13 is a side view of part of a still further conveyor system for cigarettes.
Figure 14:
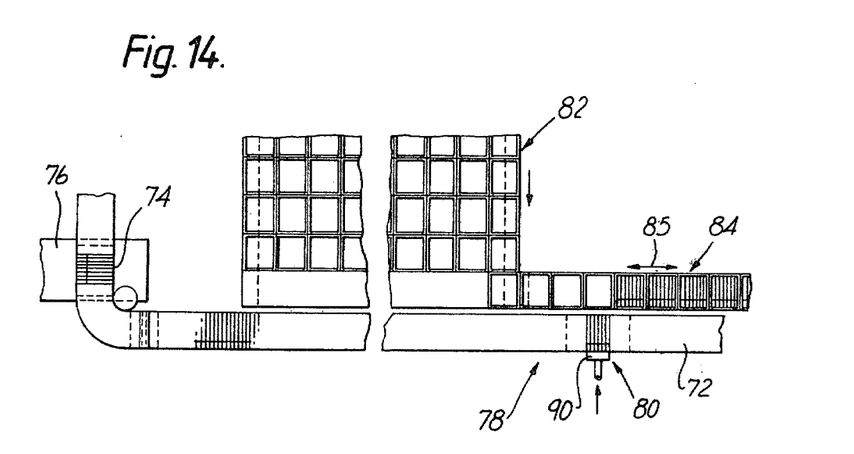
FIG. 14 is a plan view of the conveyor system of FIG. 13.

FIGS. 13 and 14 show a conveyor system in which a combined stream 72 of filter cigarettes is conveyed to a vaned hopper 74 of a cigarette packing machine 76. The conveyor 78 for the stream 72 is provided with a loading/unloading station 80 which comprises a movable band closure as disclosed in British Pat. No. 2,017,618 and as used in the conveyor systems shown in FIGS. 1 to 12. Trolleys 82 are movable on a path which is transverse to the conveyor 78 and carry compartmented trays 84 which may be extracted from and returned to a trolley 82 on a path 85 which is parallel to and adjacent the conveyor 78.

Underneath the station 80 parallel vertical bands 86 and a movable platform 88 define a vertical channel. The bands may be slightly inclined so that the channel is slightly wider at its upper end than at its lower end. A plunger 90, which extends for the length of the channel is movable between the bands 86 (when the platform is as its lowermost position) to transfer a batch of cigarettes received through the opening of station 80 between the bands towards a compartment of a tray 84. Successive compartments of the tray 84 are filled by plunging successive batches from the channel between the bands 86. The platform 88 is used to lower articles progressively into the compartment between the bands 86. Unloading is a direct reversal of the loading process.

The system according to FIGS. 13 and 14 is therefore similar to that of the systems of FIGS. 1 to 12, except that cigarettes are not delivered directly into tray compartments from above but are received in a transfer channel or compartment from which they are laterally transferred into an adjacent tray. It will be appreciated that the construction of the tray 84 may therefore differ from that of the trays used with the previous systems. For example, the tray can be closed at its upper end (in use) and may be open on one face only.

During unloading, batches or articles from a tray may be withdrawn into the compartment between bands 86 by means of a scoop-type plunger or by providing the plunger with suction, substantially as disclosed in U.S. Pat. No. 3,967,740 or U.S. Pat. No. 4,073,374.

A loading/unloading station as in FIGS. 1 to 12 or FIGS. 13 and 14, could comprise two (or more) adjacent gates or openings in series in the same conveyor. Loading or unloading would normally take place through only one gate at a time, the other gate or gates being closed. When a loading or unloading cycle through said gate is completed it is closed and another gate opened. A single rolling band gate assembly could be used, different parts of the band being extended by movable end pulleys in one direction to close one gate (the other gate being open) or in the opposite direction to close said other gate (said one gate being then open). There may be independent movement of trays to each of the gates. The advantage of this arrangement is that as soon as loading or unloading through one gate is finished loading or unloading through another gate may commence without delay. It is conceivable that loading or unloading could take place simultaneously through two or more open gates.

I claim:

1. A conveyor system for rod-like articles comprising means for conveying a stream of rod-like articles on a path in a first direction transverse to the lengths of the articles, means defining an opening in said conveying means along the path of said stream of rod-like articles through which opening a stack of articles may pass to or from the conveying means in a direction generally transverse to said first direction, gate means for selectively closing said opening, a transfer station, means defining a path for a movable container having at least one compartment for a batch of rod-like articles in stack formation, said path being arranged so that compartments may be positioned successively at said station, and transfer conveyor means for conveying articles at said station between said opening in said path and a compartment of a container in a direction transverse to the lengths of the articles and to said first direction.

2. A conveyor system as claimed in claim 1, wherein said transfer conveyor means is reversibly operable to selectively receive articles from and deliver articles to said conveying means.

3. A conveyor system as claimed in claim 2, wherein said transfer conveyor means is arranged to move articles within a compartment.

4. A conveyor system as claimed in claim 3, including further conveyor means associated with said compartment and movable in said compartment by action of said transfer conveyor means.

5. A conveyor system as claimed in claim 2, including a subsidiary path forming a junction with said conveying means at said opening, said transfer conveyor means being arranged to move articles on said path, and including means for moving articles between a compartment and said subsidiary path in a direction parallel to the lengths of the articles.

6. A conveyor system as claimed in claim 1, including a plurality of parallel compartments movable on said path.

7. A conveyor system as claimed in claim 6, wherein the compartments comprise substantially vertical channels.

8. A conveyor system as claimed in claim 7, wherein the opposite sides of said channels which are arranged to be adjacent the ends of the articles in a stack are of slightly different widths to accommodate a stack of filter tipped cigarettes.

9. A conveyor system as claimed in claim 7, wherein the sides of each channel which lie parallel to the articles diverge slightly in a direction from the bottom of the channel towards the top.

10. A conveyor system as claimed in claim 1, wherein each container comprises a plurality of compartments.

11. A conveyor system as claimed in claim 10, including two substantially parallel conveying means each provided with an opening for transfer of articles to and from a compartment, said transfer station and said container path being arranged such that two compartments in a container may be simultaneously in position for transfer to and from said respective openings.

12. A conveyor system as claimed in claim 1, including at least two substantially horizontal endless band conveyors having confronting ends, said opening being defined between said ends of said conveyors.

13. A conveyor system as claimed in claim 12, wherein said gate means includes means for moving at least one of said confronting ends of said conveyors.

14. A conveyor system for rod-like articles, including first and second conveyors for conveying streams of rod-like articles in directions transverse to their lengths, a junction between said conveyors, a path extending from said junction in a direction generally transverse to said conveyors, gate means for selectively closing said path, means for successively positioning compartments adjacent said path, and reversible intermittently-movable means for transferring a batch of articles between a compartment and said junction along said path.

15. A conveyor system for rod-like articles comprising means for converting a stream of rod-like articles on a path in a first direction transverse to the lengths of the articles, means defining an opening in said conveying means along the path of said stream of rod-like articles through which opening a stack of articles may pass to or from the conveying means in a direction generally transverse to said first direction, gate means for selectively closing said opening, means defining a path for a movable container having at least one compartment for a batch of rod-like articles in said formation, and transfer conveyor means for conveying articles between said opening in said path and a compartment of a container on said path in a direction transverse to the lengths of the articles and to said first direction.

* * * * *